United States Patent [19]

Jurgenson et al.

[11] Patent Number: 5,793,571
[45] Date of Patent: Aug. 11, 1998

[54] METHOD FOR MANUFACTURING A HEAD SUSPENSION WITH A MICROACTUATOR

[75] Inventors: Ryan A. Jurgenson, Hutchinson; Lloyd C. Goss, Silver Lake, both of Minn.

[73] Assignee: Hutchinson Technology Incorporated, Hutchinson, Minn.

[21] Appl. No.: 879,402

[22] Filed: Jun. 20, 1997

Related U.S. Application Data

[63] Continuation of Ser. No. 457,432, Jun. 1, 1995, Pat. No. 5,657,188.
[51] Int. Cl.$^6$ .............................. G11B 5/48; G11B 5/55
[52] U.S. Cl. .................................... 360/104; 360/106
[58] Field of Search ............................... 360/104–106

[56] References Cited

U.S. PATENT DOCUMENTS

| 4,814,908 | 3/1989 | Schmitz | 360/77.02 |
|---|---|---|---|
| 4,858,040 | 8/1989 | Hazebrouck | 360/78.05 |
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,359,474 | 10/1994 | Riederer | 360/78.05 |
| 5,367,420 | 11/1994 | Yagi et al. | 360/109 |
| 5,400,192 | 3/1995 | Mizoshita et al. | 360/77.16 |
| 5,408,376 | 4/1995 | Nishikura et al. | 360/109 |
| 5,438,469 | 8/1995 | Rudi | 360/109 |
| 5,521,778 | 5/1996 | Boutaghou et al. | 360/106 |
| 5,535,074 | 7/1996 | Leung | 360/104 |
| 5,539,596 | 7/1996 | Fontana et al. | 360/106 |

FOREIGN PATENT DOCUMENTS

| 0 549 814 A1 | 7/1993 | European Pat. Off. |
| 07-201148 | 4/1995 | Japan . |
| WO 93/02451 | 2/1993 | WIPO . |

OTHER PUBLICATIONS

Miu, et al., "Silicon Micromachined SCALED Technolgy," 1993 JSME International Conference on Advanced Mechatronics, Tokyo, Japan, Aug. 1993, pp. 527–532.

Mori, et al., "A Dual–Stage Magnetic Disk Drive Actuator Using A Piezoelectric Device for a High Track Density," IEEE Transactions on Magnetics, Nov. 1991, vol. 27, No. 6, pp. 5298–5300.

Miu, et al., "Silicon Microstructures and Microactuators for Compact Computer Disk Drives," IEEE Control Systems, Dec. 1994, pp. 52–57.

Miu, et al., "Silicon Microgimbals for Super–Compact Magnetic Recording Rigid Disk Drives," Adv. Info. Storage Syst., vol. 5, 1993, pp. 139–152.

O'Connor, "Microengines go for a spin," Mechanical Engineering, Feb. 1995, p. 66.

O'Connor, "Miniature motors for future PCs," Mechanical Engineering, Feb. 1995, pp. 63–65.

(List continued on next page.)

*Primary Examiner*—A. J. Heinz
*Attorney, Agent, or Firm*—Faegre & Benson

[57] ABSTRACT

A method for manufacturing a disk drive suspension including a load beam and a microactuator. The load beam and microactuator are formed from three sheets of laminated material. A first sheet of material is chemically etched to form the load beam and lower electromagnetic field generating coil members of the microactuator. A second sheet of material is chemically etched to form stationary and moving pole members of the microactuator, and a third sheet of material is chemically etched to form upper magnetic field generating coil members. The sheets of material are bonded together to form first and second magnetic field generating coils surrounding the stationary pole member. A moving pole member is chemically etched from the second sheet of laminated material and has a free end mounted between the coils at the ends of the stationary pole member. The opposite end of the moving pole member is mounted to a distal end of the load beam. In response to tracking control signals, the moving pole member moves the distal end of the load beam along a tracking axis.

27 Claims, 9 Drawing Sheets

OTHER PUBLICATIONS

Tang, et al., "Silicon Micromachined Electromagnetic Microactuators For Rigid Disk Drives," submitted for presentation at the INTERMAG Conference Apr. 1995, 2 pages.

Tang, et al., "Design, Fabrication and Testing of Micromachined Electro–magnetic Microactuators for Rigid Disk Drives," submitted for presentation at the Transducer '95 Conference, Apr. 1995, 2 pages.

Temesvary, et al., Design, Fabrication and Testing of Silicon Microgimbals for Super–Compact Rigid Disk Drives, IEEE/ASME J. of MEMS, Dec. 1994, pp. 1–26.

METHOD FOR MANUFACTURING A HEAD SUSPENSION WITH A MICROACTUATOR

This application is a continuation of application Ser. No. 08/457,432, filed Jun. 1, 1995 now U.S. Pat. No. 5,657,188.

BACKGROUND OF THE INVENTION

1. Field of the Invention

The present invention relates generally to suspensions for supporting read/write heads over recording media. In particular, the present invention is head suspension assembly with a tracking microactuator.

2. Description of the Related Art

Magnetic disk drives include suspensions for supporting magnetic read/write heads over information tracks of rotating disks. The well known and widely used Watrous-type suspensions include a load beam having a baseplate on a proximal end, a flexure on a distal end, a relatively rigid region adjacent to the flexure and a spring region between the baseplate and rigid region. An air-bearing slider which includes the magnetic head is mounted to the flexure. The baseplate of the suspension is mounted to an actuator arm. A motor which is controlled by a servo control system rotates the actuator arm to position the magnetic head over desired information tracks on the magnetic disk.

Disk drive manufacturers continue to develop smaller yet higher storage capacity drives. Storage capacity increases are achieved in part by increasing the density of the information tracks on the magnetic disks (i.e., by using narrower and/or more closely spaced tracks). As track density increases, however, it becomes increasingly difficult for the motor and servo control system to quickly and accurately position the magnetic head over the desired servo track.

The use of microactuators or fine tracking motors has been proposed to overcome these problems. One such microactuator is disclosed in the Denny K. Miu et al. article, *Silicon Microstructures and Microactuators for Compact Computer Disk Drives*, IEEE Control Systems (December, 1994). This microactuator is machined from silicon and is positioned between the flexure and slider.

There is, however, a continuing need for improved microactuators. In particular, the microactuator must be capable of quickly and accurately positioning the magnetic head. The microactuator should be lightweight to minimize detrimental effects on the resonance characteristics of the suspension, and relatively thin to enable close disk-to-disk spacing. To be commercially viable the microactuator must also be reliable and capable of being efficiently manufactured.

SUMMARY OF THE INVENTION

The present invention is an efficient method of manufacturing a suspension which includes a relatively lightweight, low-profile tracking microactuator. The method includes providing at least a first laminated sheet of material having at least three layers including a first layer of spring material, a second layer of electrically insulating material, and a third layer of electrically conducting material. A load beam is formed from the first laminated sheet of material and includes a rigid region, a mounting region on a proximal end of the load beam, and a distal end. A microactuator is formed in the rigid region of the load beam and includes first and second magnetic field generating coils. At least portions of the first and second magnetic field generating coils are formed by chemically etching at least the third layer of the first laminated sheet. The microactuator is responsive to tracking control signals for moving the distal end of the load beam along a tracking axis with respect to the rigid region.

One embodiment includes forming the load beam with a microactuator using three sheets of laminated material. The first sheet is chemically etched to form lower loop members of two magnetic field generating coils. A second sheet of laminated material has two layers including a first layer of magnetic material having a relatively high permeability and a second layer of electrically insulating material. The second sheet is chemically etched to form a stationary pole member and a moving pole member. A third sheet of laminated material also has two layers including a first layer of electrically conductive material and a second layer of electrically insulating material. The third sheet is chemically etched to form upper loop members of the two electromagnetic field generating coils. The first, second and third sheets are bonded together to form first and second magnetic field generating coils around the stationary pole member. A free end of the moving pole member is mounted to extend between the two coils and an opposite end is mounted to the distal end of the load beam. In response to tracking control signals, the moving pole member moves the distal end of the load beam along a tracking axis.

DETAILED DESCRIPTION OF THE PREFERRED EMBODIMENTS

Figure 1:
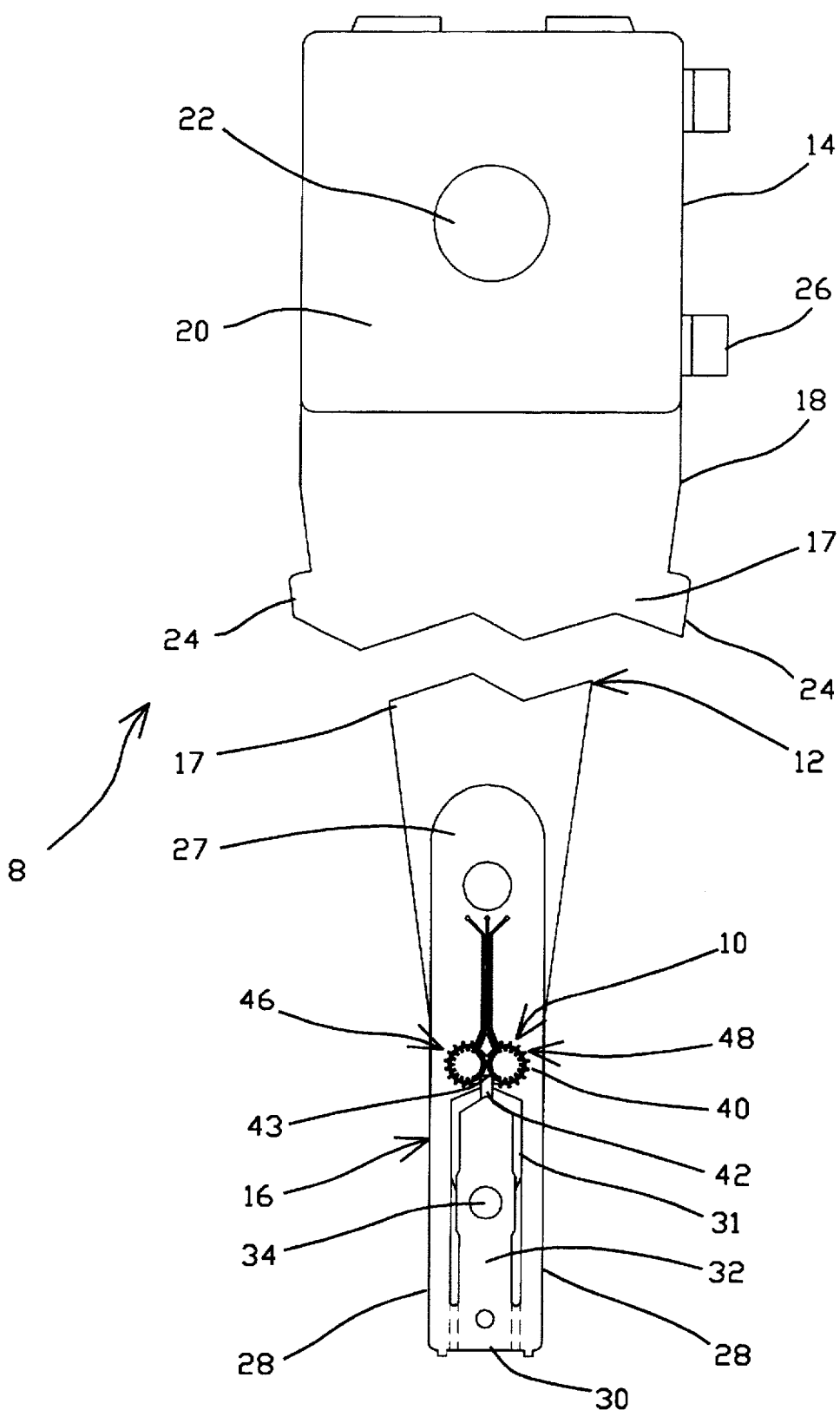
FIG. 1 is a top view of a suspension with a separately fabricated T-flexure including a tracking microactuator in accordance with the present invention.

A head suspension 8 which includes a tracking microactuator 10 in accordance with the present invention is illustrated generally in FIG. 1. As shown, suspension 8 includes a load beam 12 having a base 14 on a proximal end, a T-type flexure 16 on a distal end, a relatively rigid region 17 adjacent to the flexure, and a radius or spring region 18 between the base and rigid region. A baseplate 20 is welded to base 14 and includes a swage block 22 for mounting the suspension 8 to a disk drive actuator arm (not shown in FIG. 1). A pair of channel rails 24 are formed in the opposite sides of the load beam 12 along the length of the rigid region 17. Tabs 26 which extend from rails 24 and base 14 are used to position and support read/write head lead wires (not shown). Load beam 12 can be fabricated and formed from a sheet of stainless steel or other resilient material in a conventional manner.

In the embodiment shown, flexure 16 is fabricated and formed separately from load beam 12, and is welded or otherwise mounted to the load beam during the manufacture of suspension 8. This flexure 16 includes a mounting portion 27, a pair of spaced arms 28 which extend from the mounting portion, and a cross member 30 which extends between the distal ends of the arms. The arms 28 and cross member 30 form a gap 31 through the distal end of flexure 16. A tongue 32 extends from the cross member 30 into gap 31 toward load beam base 14. Cross member 30 is offset from arms 28 so the plane of the cross member and tongue 32 are offset from the plane of the arms. Tongue 32 also includes a conventional load point dimple 34. Although not shown in FIG. 1, a slider with a magnetic read/write head will be adhesively bonded or otherwise mounted to tongue 32 to form a head gimbal assembly from suspension 8.

Microactuator 10 can be described in greater detail with reference to FIGS. 1–4. In the embodiment shown, microactuator 10 is an electromagnetic device including magnetic field-generating structure 40 and moving pole member 42. Moving pole member 42 is mounted to and extends from tongue 32, and includes a free end 43. Pole member 42 is fabricated from NiFe or other relatively high permeability magnetic material. Although not visible in FIGS. 1–4, a spacing member can be located between moving pole member 42 and the portion of the tongue 32 to which the pole member is mounted to position the moving member of the same relative height as the stationary pole member (described below) of field-generating structure 40. The spacing member can be formed from polyimide or other materials.

Figure 2:
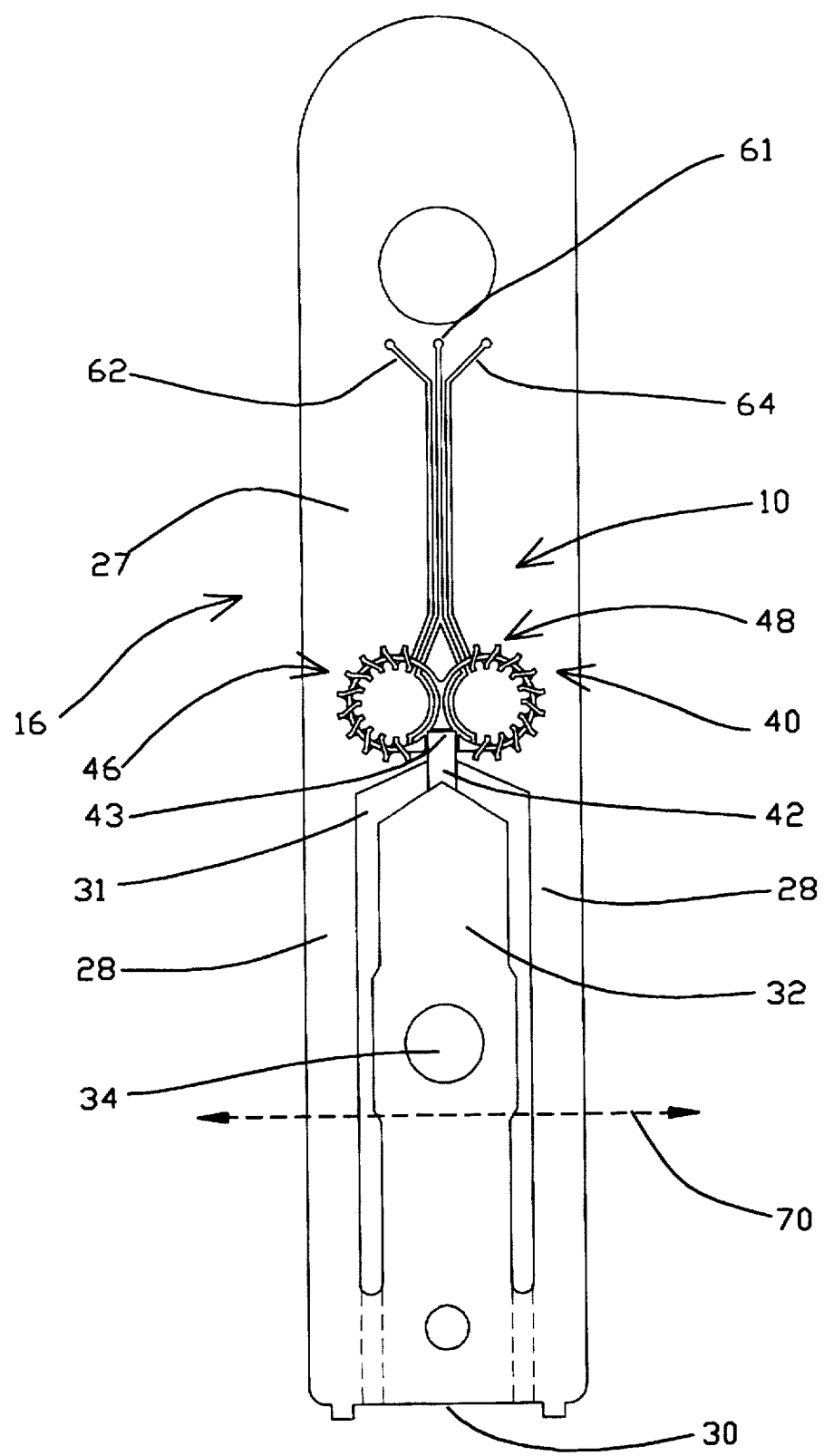
FIG. 2 is a detailed view of the flexure shown in FIG. 1.

Field-generating structure 40 is fixedly mounted with respect to the rigid region 17 of load beam 12, and is fabricated on the flexure 16 in the embodiment shown in FIGS. 1 and 2. Structure 40 includes a fixed or stationary pole member 44 and a pair of coils 46 and 48. Pole member 44 is a sideways generally "3"-shaped member fabricated from NiFe or other relatively high permeability magnetic material, and has a pair of semicircular sections 50 and 52 which terminate at central end 56 and side ends 54 and 58. The ends 54, 56 and 58 of pole member 44 form a gap 60 that surrounds the three edges of the free end 43 of moving pole member 42. Coils 46 and 48 include a plurality of individual loops fabricated from Cu, BeCu or other electrically conductive material, and are formed around the semicircular sections 50 and 52 of pole member 44. In the embodiment shown, the first ends of coils 46 and 48 adjacent to the ends 54 and 58, respectively, of pole member 44 are both electrically connected to a common lead 61. The second end of coil 46 is connected to lead 62, while the second end of coil 48 is connected to lead 64. Although not shown, leads 61, 62 and 64 extend along the length of suspension 8 (or are connected to lead wires which extend along the suspension) and are connected to receive tracking drive signals from a tracking servo system.

As noted above, suspension 8 is configured to have a slider with a read/write head (not shown) adhesively bonded or otherwise mounted to tongue 32 to form a head suspension assembly. The head suspension assembly is configured to be mounted to an actuator arm of a magnetic disk drive (not shown) to support the slider over the surface of a magnetic disk. Tracking control signals applied to leads 61, 62 and 64 cause the field-generating structure 40 to produce a magnetic field which exerts forces on moving pole member 42 to move flexure tongue 32 from its neutral position along a transverse tracking axis 70. Flexure 16 and microactuator 10 are positioned on the suspension 8 in such a manner that the motion along tracking axis 70 is generally perpendicular to the information tracks on the magnetic disk. In particular, tracking control signals are applied to leads 61 and 64 to energize coil 48 in such a manner as to create a magnetic field between stationary pole member ends 54 and 58. The magnetic field produced by coil 48 pulls the moving pole member 42 and tongue 32 toward the end 58 of stationary pole member 44. Similarly, tracking control signals are applied to leads 61 and 62 to energize coil 46 in such a manner as to pull the moving pole member 42 and flexure tongue 32 toward end 54 of stationary pole member 44.

Accordingly, microactuator 10 functions as a fine tracking actuator. In response to the tracking control signals, microactuator 10 drives and positions flexure tongue 32, and therefor the slider and read/write head mounted thereto, with respect to individual information tracks on the disk. The magnitude of the tracking control signals are controlled by the servo system to control the extent of motion of the tongue 32 from its neutral position. The resilient nature of arms 28 and cross member 30 urges tongue 32 back to its neutral position when coils 46 and 48 are not energized.

Figure 3:
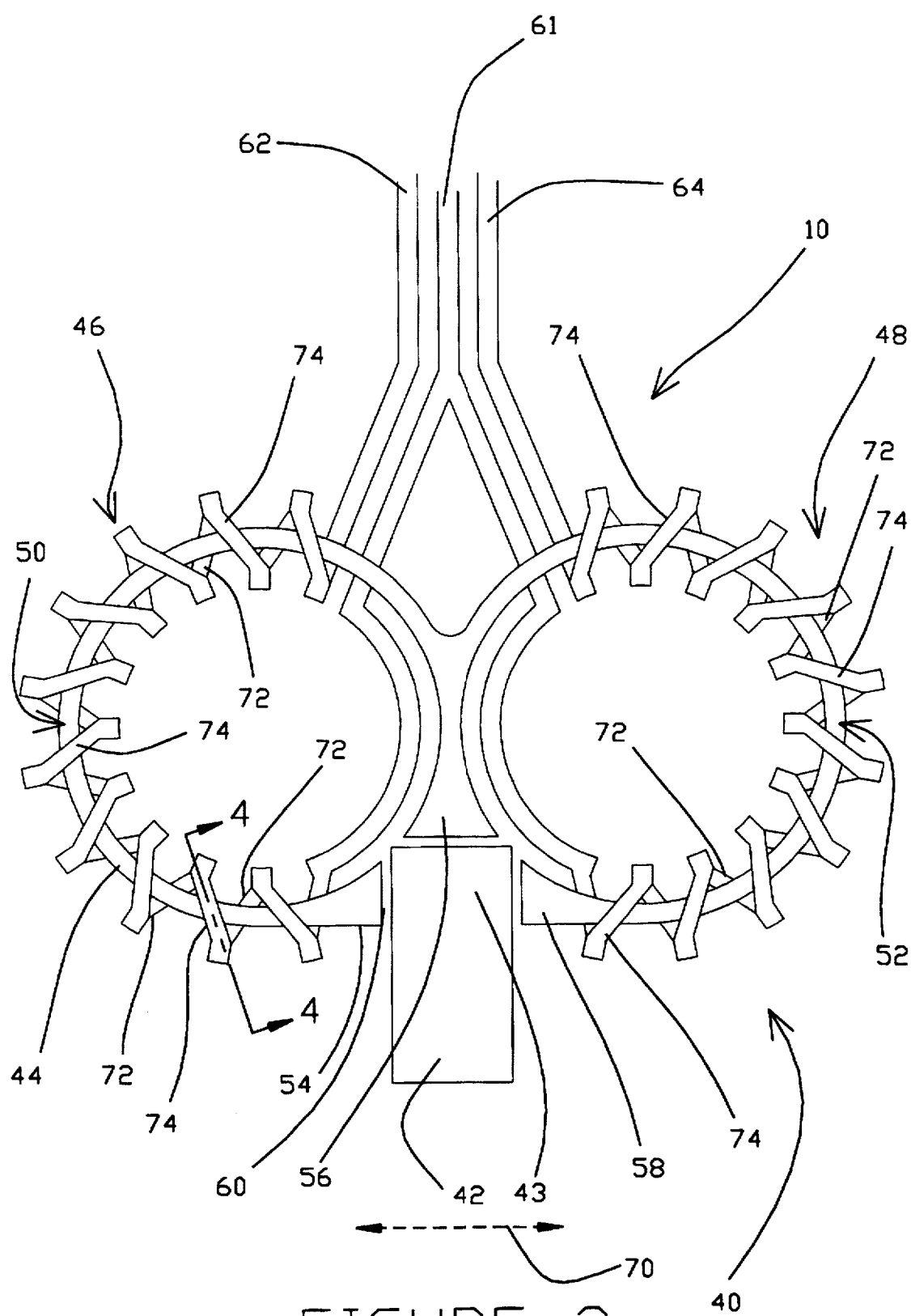
FIG. 3 is a detailed view of the microactuator shown in FIG. 1.
Figure 4:
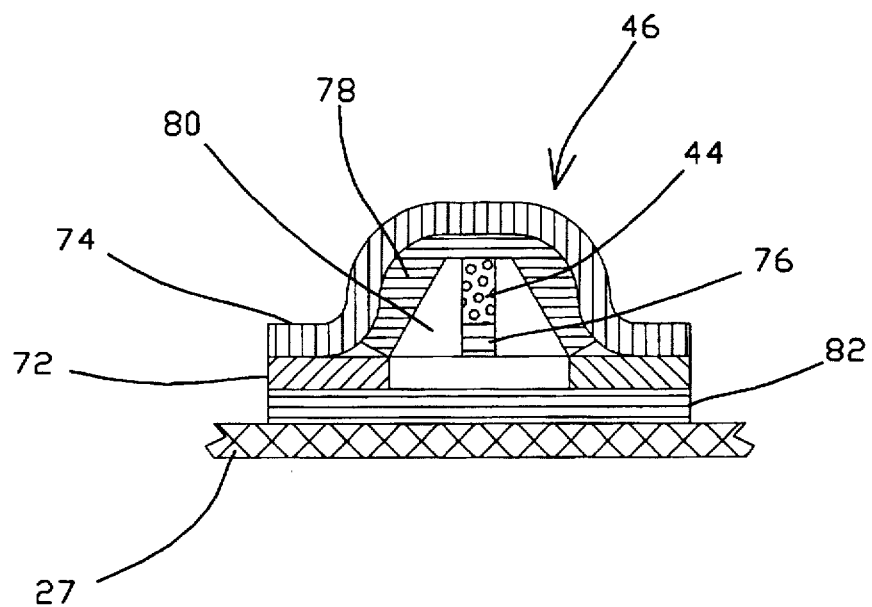
FIG. 4 is a sectional view of the microactuator shown in FIG. 3, taken along line 4—4.

As shown in FIGS. 3 and 4, each loop or turn of coils 46 and 48 includes a generally flat lower loop portion 72 that extends under the pole member 44, and an inverted generally "U"-shaped upper loop portion 74 that extends over the pole member. The opposite ends of each upper loop portion 74 are electrically interconnected to the associated ends of the adjacent lower loop portions 72. Pole member 44 is spaced and electrically isolated from lower loop portions 72 by a lower dielectric or insulating member 76. In the embodiment shown, the lower insulating member 76 is formed to the same shape as pole member 44. The insulating member 76 can be fabricated from polyimide or other dielectric material having appropriate dielectric characteristics. Pole member 44 is also spaced and electrically isolated from upper loop portions 74 by upper insulating members 78 which can be fabricated from the same dielectric material as lower insulating member 76. The interior surfaces of upper insulating members 78 are spaced from the sides of pole member 44 and lower insulating member 76 to form air gaps 80. As described below, coils 46 and 48 can be formed as low-profile members on the upper surface of the mounting portion 27 of flexure 16. Dielectric or insulating layer 82 separates the coils 46 and 48 and leads 61, 62 and 64 from the surface of flexure 16.

Figure 5:
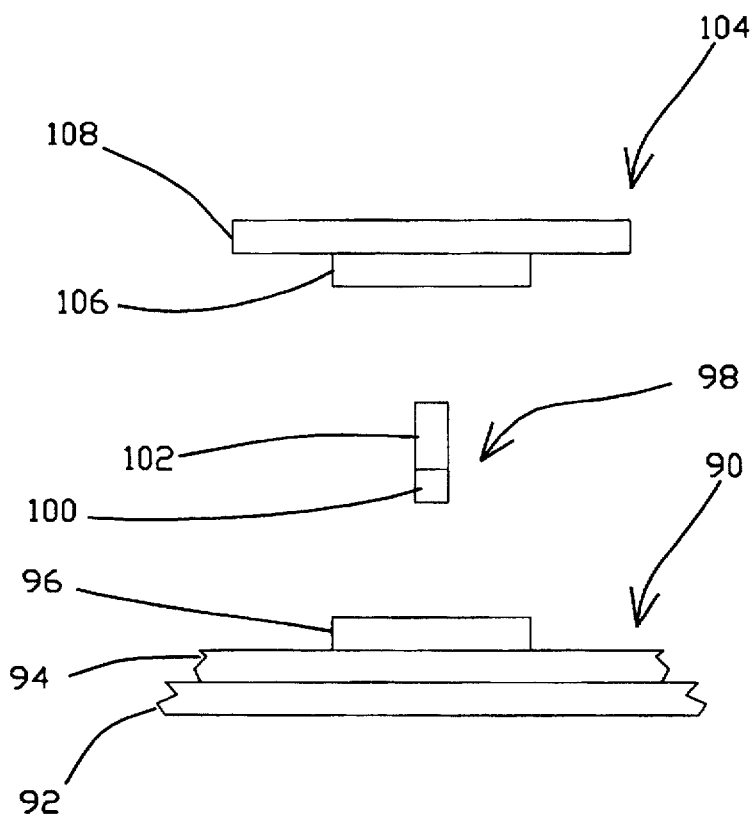
FIG. 5 is an illustration of laminated sheet of material from which the flexure shown in FIG. 1 can be fabricated.

A method for fabricating flexure 16 and microactuator 10 can be described with reference to FIGS. 3–5. In this embodiment, the mounting portion 27, arms 28, cross member 30, tongue 32, insulating layer 82, lower loop portions 72 of coils 46 and 48 and leads 61, 62 and 64 are fabricated and formed from a laminated sheet of material such as 90 which is illustrated generally in FIG. 5. Sheet 90 includes a lower layer 92 of stainless steel (i.e., the resilient structural material from which the flexure is fabricated), an intermediate layer 94 of polyimide or other dielectric material overlaying the lower layer, and an upper layer 96 of Cu or BeCu or other conductor overlaying the intermediate layer. Using conventional or otherwise known techniques, blanks having the desired external dimensions of flexure 16 are cut from the sheet of material 90, and the lower layer 92 patterned and etched to form mounting portion 27, arms 28, cross member 30 and tongue 32. Intermediate layer 94 and upper layer 96 are then patterned and etched to form the insulating layer 82, lower loop portions 72 and leads 61, 62 and 64 on mounting portion 27. Cross member 30 can then be formed, again in a conventional manner, to offset the plane of tongue 32 from the plane of arms 28 to provide gimbaling clearance for a slider mounted to the tongue.

Moving pole member 42 and associated spacing member (if any), stationary pole member 44 and lower insulating member 76 can be formed or etched in a similar manner from a laminated sheet of material such as 98 which includes a lower layer 100 of polyimide or other dielectric material, and an upper layer 102 of NiFe or other relatively high permeability material overlaying the lower layer. Upper loop portions 74 and insulating members 78 can be formed by etching a sheet of laminated material such as 104 which includes a lower layer 106 of polyimide or other dielectric material, and an upper layer 108 of Cu, BeCu or other conductor overlaying the lower layer. After appropriately sized elements are etched from the sheet 104, the elements can be formed using conventional techniques (e.g., a die or press) into the appropriate shape. Using tabbing techniques to assure proper alignment or registration, the formed and etched sheet 98 can be bonded by adhesive or otherwise mounted to the formed and etched sheet 90. Similarly, the formed and etched sheet 104 is aligned with and mounted to the sheets 90 and 98. The opposite ends of each upper loop portion 74 are then soldered to the associated ends of the lower loop portions 72 by sweat-soldering or other conventional techniques. Final forming and detabbing operations are then performed to complete the fabrication of the flexures 16 with microactuators 10. Flexure 16 is welded or otherwise mounted to the distal end of load beam 12 to complete the fabrication of suspension 8.

Figure 6:
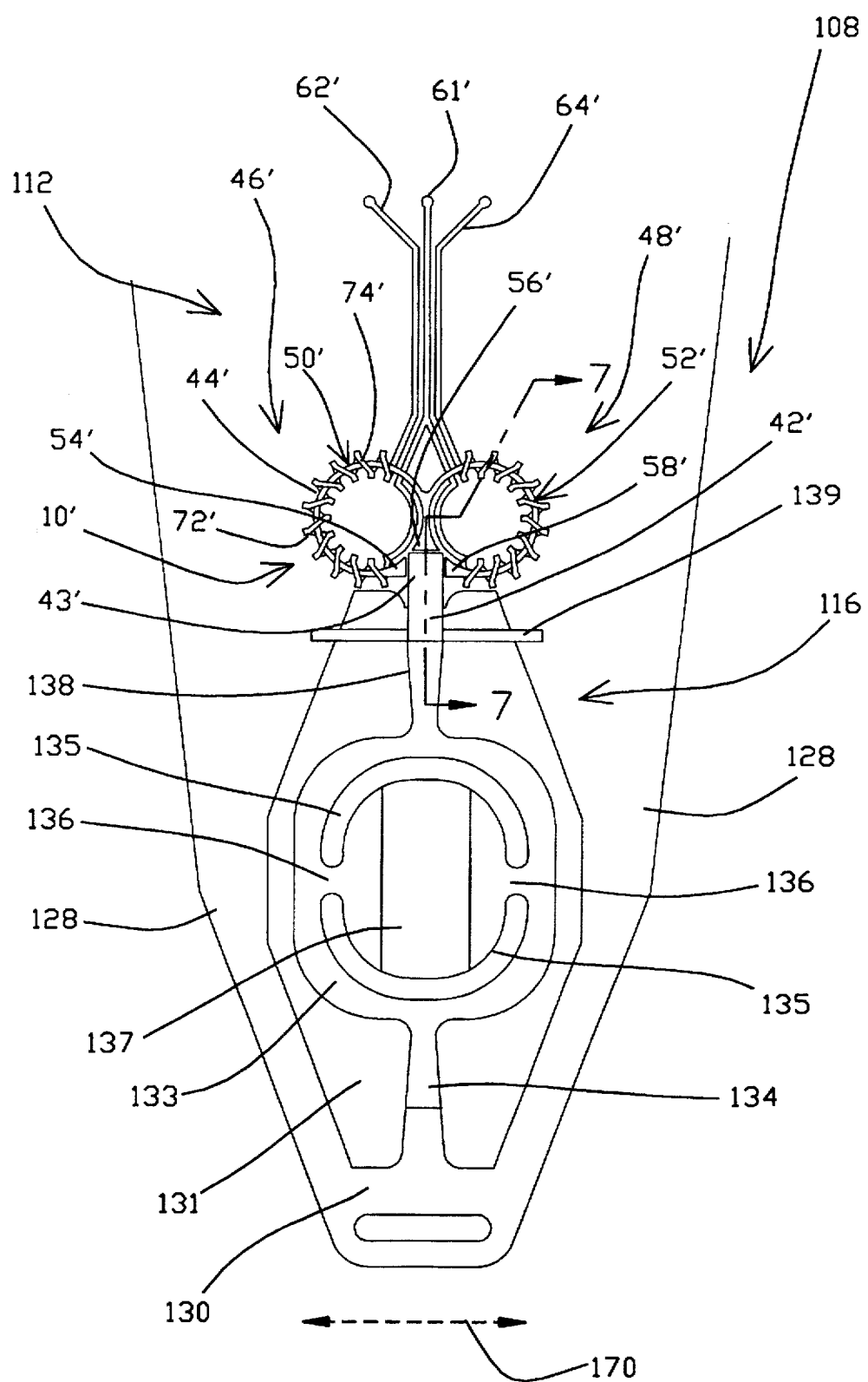
FIG. 6 is an illustration of a suspension with an integrated gimbal-type flexure and including a tracking microactuator in accordance with the present invention.
Figure 7:
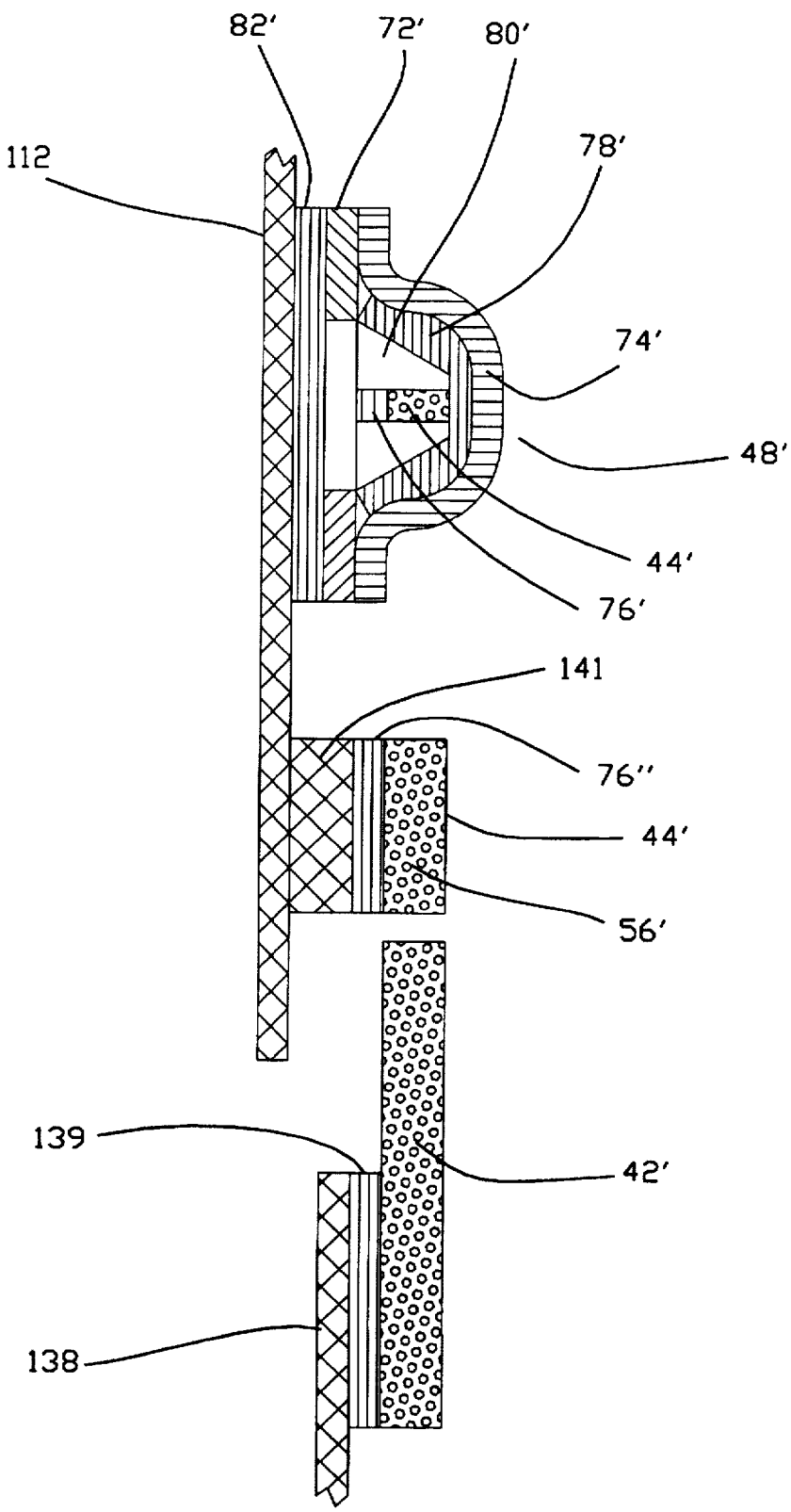
FIG. 7 is a sectional view of the microactuator shown in FIG. 6, taken along line 7—7.

FIGS. 6 and 7 are illustrations of the distal end of a suspension 108 including an integrated gimbal 116 (i.e., a gimbal-type flexure) and a tracking microactuator 10' in accordance with a second embodiment of the present invention. Gimbal 116 is formed from the same piece of stainless steel or other material forming load beam 112. As shown, load beam 112 includes a pair of outer members 128 which are joined at the tip 130 of suspension 108 to form an aperture 131. Gimbal 116 includes an outer ring 133 supported within aperture 131 by a first roll axis arm 134 which extends between the ring and tip 130. The gimbal 116 also includes a pair of semicircular slots 135, each of which has ends spaced from the ends of the other slot to form a pair of pitch axis arms 136. Arms 136 support a slider bonding pad 137 from ring 133. A second roll axis arm 138 extends toward microactuator 10' from the side of ring 133 opposite the first roll axis arm 134. A bridge support member 139 is fixedly mounted to the roll axis arm 138. Bridge support member 139 is oriented generally transverse to the roll axis arm, and extends across gap 131. The ends of bridge support member 139 are bonded or otherwise mounted to members 128. Bridge support member 139 is fabricated from polyimide or other flexible material, and thereby supports the gimbal 116 with respect to the load beam 112 while allowing the gimbal to be moved along tracking axis 170 by microactuator 10'.

Microactuator 10' can be identical to microactuator 10 described above with reference to FIGS. 1–6, but is mounted directly on load beam 112 rather than on a separate flexure such as 16. Accordingly, features and components of microactuator 10' that are structurally and/or functionally the same as corresponding features and components of microactuator 10 are identified with identical but primed reference numerals (i.e., x') in FIGS. 6 and 7. Suspension 108 can also be fabricated in a manner similar to that of suspension 8 and described above. In particular, load beam 112, gimbal 116, insulating layer 82', lower loop portions 72' and leads 61', 62' and 64' can all be etched and formed from a laminated sheet of material such as that shown at 90 in FIG. 5. Stationary pole member 44', lower insulating member 76', moving pole member 42' and bridging support member 139 can be etched and formed from a laminated sheet of material such as than shown at 98 in FIG. 5. Upper loop portions 74' of coils 46' and 48' and insulating members 78' can be etched and formed from a laminated sheet of material such as that shown at 104 in FIG. 5. These three formed sheets of material are then assembled and finished in a manner similar to that described above with reference to suspension 8 to complete the suspension 108. As shown in FIG. 7, suspension 108 also includes a spacer 141 to position stationary pole member 44' at the same height as moving pole member 42' for efficient magnetic coupling. Spacer 141 can be etched from the stainless steel from which load beam 112 is formed.

Figure 8:
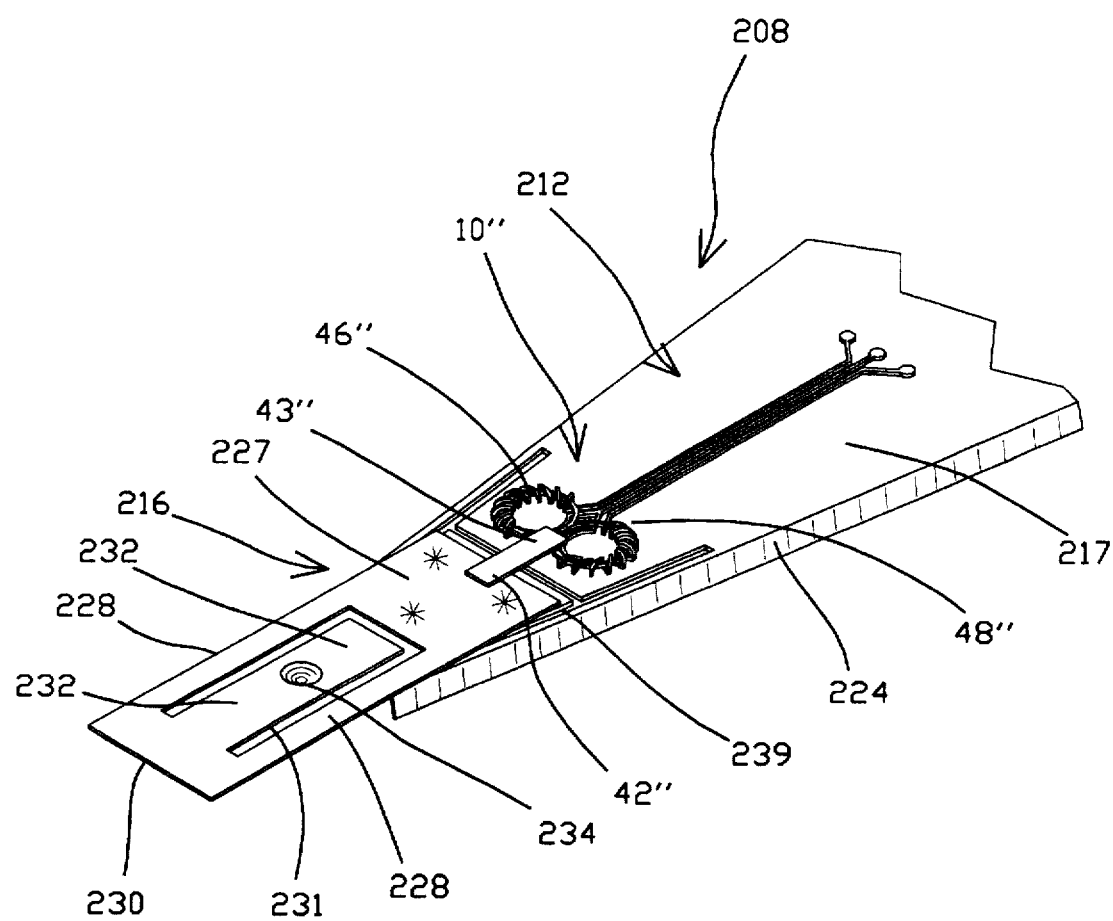
FIG. 8 is an illustration of a suspension having a laterally movable tip and including a tracking microactuator in accordance with the present invention.
Figure 9:
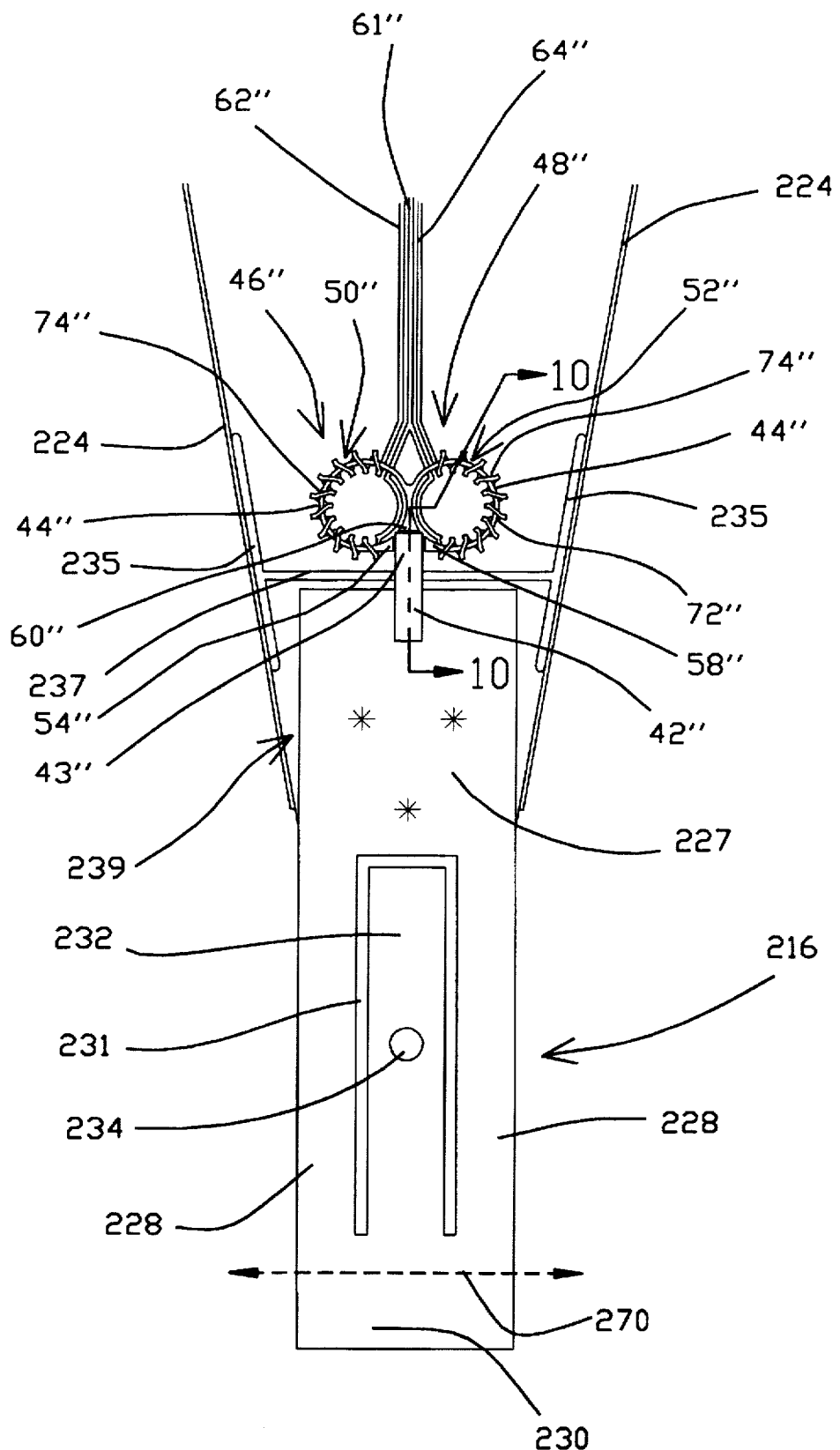
FIG. 9 is a detailed view of the tip of the suspension shown in FIG. 8.
Figure 10:
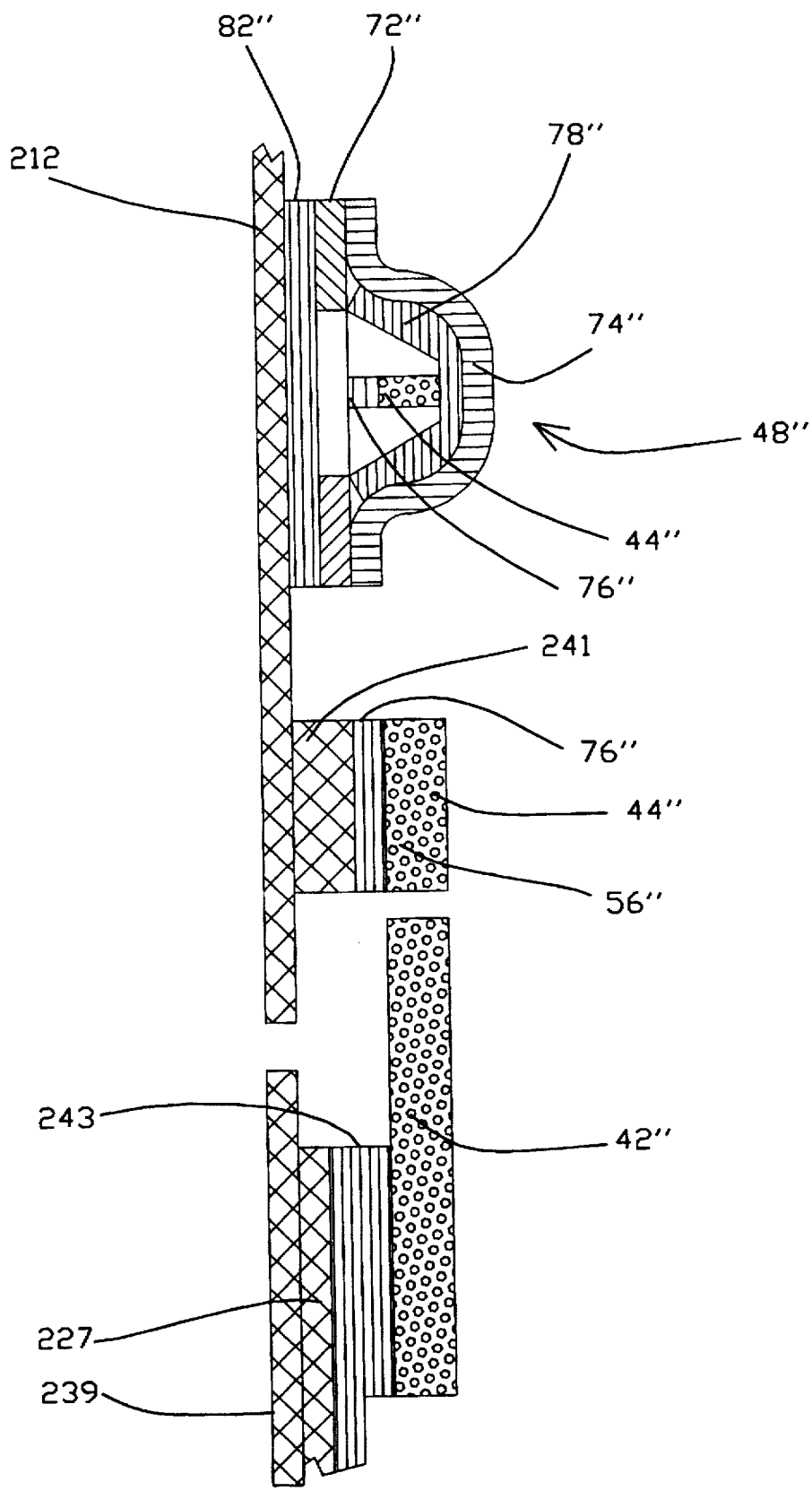
FIG. 10 is a sectional view of the microactuator shown in FIG. 9, taken along line 10—10.

FIGS. 8, 9 and 10 are illustrations of the distal end of a suspension 208 including a tracking microactuator 10" in accordance with a third embodiment of the present invention. Suspension 208 includes a load beam 212 having a rigid region 217. A pair of flanges or rails 224 are formed in the opposite sides of the load beam 212 along the length of the rigid region 217. Flexure 216 is fabricated and formed separately from load beam 212, and is welded or otherwise mounted to the load beam during the manufacture of suspension 208. This flexure 216 includes a mounting portion 227, a pair of spaced arms 228 which extend from the mounting portion, and a cross member 230 which extends between the distal ends of the arms. The arms 228 and cross member 230 form a gap 231 through the distal end of flexure 216. A tongue 232 extends from the cross member 230 into gap 231 toward the load beam base (not visible in FIGS. 8–10). Tongue 232 also includes a conventional load point dimple 234. In alternative embodiments (not shown) the load point dimple is formed on load beam 212.

A pair of elongated slots 235 are formed on opposite sides of the rigid region 217 of load beam 212, adjacent to the rails 224. As shown, the slots 235 are located near the distal end of load beam 212, but the distal ends of the slots are terminated short of the distal end of the load beam. A transverse slot 237 which extends between slots 235 is also formed in the rigid region 217 of load beam 212. Slots 235 and 237 form a flexure mounting region 239 on the distal end of load beam 217. The flexure mounting region 239 is attached to the remaining portions of the load beam 217 by rails 224. Mounting portion 227 of flexure 216 is welded or otherwise mounted to the mounting region 239 of load beam 212 with the tongue 232 extending beyond the distal end of the load beam. Rails 224 in the regions of slots 235 provide a relatively rigid support between the flexure mounting region 239 and remaining portions of the load beam 212 with respect to relative motion along an axis normal to the plane of the load beam, while providing sufficient resilient flexibility to allow microactuator 10" to move the mounting region with respect to the remaining load beam portions along a tracking axis 270.

Microactuator 10" can be identical to microactuator 10 described above with reference to FIGS. 1–5, but is mounted directly on load beam 212 adjacent to mounting portion 239 rather than on a separate flexure such as 16. Accordingly, features and components of microactuator 10" that are structurally and/or functionally the same as corresponding features and components of microactuator 10 are identified with identical but primed reference numerals (i.e., x') in FIGS. 8–10. Suspension 208 can also be fabricated in a manner similar to that of suspension 8 as described above. In particular, load beam 212, insulating layer 82" lower loop portions 72" and leads 61", 62" and 64" can all be etched and formed from a laminated sheet of material such as that shown at 90 in FIG. 5. Flexure 216 can also be etched and formed from a laminated sheet of material such as that shown at 90 in FIG. 5. Fixed pole member 44", lower insulating member 76", moving pole member 42" and a dielectric member 239 below the moving pole member can be etched and formed from a laminated sheet of material such as than shown at 98 in FIG. 5. Upper loop portions 74" of coils 46" and 48" and insulating members 78" can be etched and formed from a laminated sheet of material such as that shown at 104 in FIG. 5. Stationary pole member 44" is also spaced form the surface of load beam 212 by spacer 241 in the embodiment shown in FIG. 10. These three formed sheets of material are then assembled and finished in a manner similar to that described above with reference to suspension 8 to complete the suspension 208.

Suspensions including tracking microactuators in accordance with the present invention offer considerable advantages. The microactuator is relatively lightweight and will not substantially impair the resonance characteristics of the suspension. Furthermore, since the bulk of the microactuator (i.e., the field-producing structure) is located on the load beam rather than the moving portion of the flexure, the moving portion of the flexure does not have to be redesigned with additional support to accommodate the microactuator. No lead wires have to extend across the gap to the moving portion of the flexure, so the static attitude characteristics of the flexure are unaffected by the microactuator. The microactuator is reliable, has a relatively low profile and is relatively efficient to fabricate.

Although the present invention has been described with reference to preferred embodiments, those skilled in the art will recognize that changes can be made in form and detail without departing from the spirit and scope of the invention.

What is claimed is:

1. A method for manufacturing a disk drive suspension, including:
   forming, from a spring material layer, a load beam having a rigid region, a mounting region on a proximal end, a flexure on a distal end, and a spring region between the mounting region and rigid region; and
   forming on the load beam, from a plurality of layers of material including at least an insulating layer overlaying the layer of spring material and a conductor layer overlaying the insulating layer, an electromagnetic microactuator including at least one electromagnetic field-generating coil for causing the flexure to move along a tracking axis with respect to the mounting region.

2. The method of claim 1 wherein forming the microactuator includes forming the microactuator on the rigid region of the load beam.

3. The method of claim 1 wherein forming the microactuator includes forming an electromagnetic actuator including at least two field-generating coils.

4. The method of claim 1 wherein:
   forming the load beam includes forming a load beam having at least one linkage arm for supporting a distal section of the load beam including the flexure for movement along a tracking axis with respect to proximal section of the load beam including the mounting region; and
   forming the microactuator includes forming the microactuator on the proximal section of the load beam.

5. The method of claim 4 wherein forming the microactuator includes forming the microactuator on the rigid region of the load beam.

6. The method of claim 1 wherein forming the load beam and at least one microactuator includes forming the load beam and microactuator from a laminated sheet including the spring material layer, the insulating layer overlaying the spring material layer and the conductor layer overlaying the insulator layer.

7. A method for manufacturing a disk drive suspension including a microactuator from a laminated sheet of material including at least a metal spring material layer, an insulating layer overlaying the spring material layer and a conductor layer overlaying the insulating layer, including:
   forming, from the spring material layer, a load beam having a mounting region on a proximal end, a distal end, and a linkage between the proximal and distal ends for enabling motion of the distal end with respect to the proximal end about a tracking axis; and
   forming, from at least the insulating and conductor layers, at least a first portion of an electromagnetic microactuator including at least one magnetic field-generating coil, for enabling tracking motion of the distal end of the load beam with respect to the proximal end.

8. The method of claim 7 and further including forming, from at least the conductor layer, leads for coupling tracking control signals to the microactuator.

9. The method of claim 7 and further including:
   forming a second portion of the microactuator from a laminated sheet of material including at least a conductor layer and an insulating layer overlaying the conductor layer; and
   attaching the second portion of the microactuator to the load beam.

10. The method of claim 7 wherein forming the load beam and microactuator include chemically etching the laminated sheet of material.

11. The method of claim 7 wherein forming the load beam includes through-etching gaps in the spring material to form the linkage.

12. The method of claim 7 and further including:
   forming a flexure from a sheet of spring material; and
   attaching the flexure to the distal end of the load beam.

13. The method of claim 7 and further including forming an integral flexure in the distal end of the laminated sheet of material.

14. A method for manufacturing a disk drive suspension including the steps of:
   providing a laminated sheet having at least three layers of material including a first layer of spring material, a second layer of electrically insulating material overlaying the first layer, and a third layer of electrically conducting material overlaying the second layer;
   forming a load beam from the laminated sheet, the load beam having a rigid region, a mounting region on a proximal end of the load beam, and a flexure at a distal end of the load beam, the flexure for mounting a read/write head; and
   forming a microactuator in the rigid region of the load beam and including first and second magnetic field generating structures at least portions of which are formed by chemically etching at least the first layer of the laminated sheet wherein the microactuator is responsive to tracking control signals for moving the distal end of the load beam including the flexure along a tracking axis.

15. The method of claim 14 wherein the step of forming the load beam includes
   forming a linkage in the load beam and for supporting the distal end of the load beam to allow motion of the distal end of the load beam including the flexure along the tracking axis.

16. The method of claim 15 wherein the step of forming the microactuator includes forming two magnetic field generating structures at least portions of which are laterally spaced from each other.

17. The method of claim 16 wherein the step of forming the microactuator includes fixedly forming at least one of the magnetic field generating structures in the rigid region of the load beam.

18. The method of claim 15 wherein the step of forming the microactuator includes forming first and second magnetic field generating structures such that magnetic fields generated by the first and second magnetic field generating structures cause the linkage to deform moving the distal end of the load beam along the transverse tracking axis.

19. The method of claim 14 wherein the step of forming the load beam includes forming a linkage having at least two rails for supporting the distal end of the load beam such that magnetic fields generated by the first and second magnetic field generating structures cause the two rails to deform moving the distal end of the load beam including the flexure along the tracking axis.

20. A method for manufacturing a disk drive suspension including the steps of:

providing at least a first laminated sheet having at least three layers of material including a first layer of spring material, a second layer of electrically insulating material overlaying the first layer, and a third layer of electrically conducting material overlaying the second layer;

forming a load beam from the first laminated sheet, the load beam having a rigid region, a mounting region on a proximal end of the load beam, and a distal end; and forming a microactuator in the rigid region of the load beam and including first and second magnetic field generating coils at least portions of which are formed by chemically etching at least the first layer of the laminated sheet wherein the microactuator is responsive to tracking control signals for moving the distal end of the load beam including a flexure along a tracking axis.

21. The method of claim 20 wherein the step of forming the microactuator includes chemically etching at least the third layer of the first laminated sheet to form a plurality of lower loop members for the first and second magnetic field generating coils.

22. The method of claim 21 wherein the step of forming the microactuator includes:

providing a second laminated sheet having at least two layers of material including a first layer of permeable magnetic material and a second layer of electrically insulating material;

chemically etching a stationary pole member from the second laminated sheet;

bonding the stationary pole member onto the plurality of lower loop members;

providing a third laminated sheet having at least two layers of material including a first layer of electrically conductive material and a second layer of electrically insulating material;

chemically etching the first layer of the third laminated sheet to form a plurality of upper loop members for each magnetic field generating coil;

bonding each of the plurality of lower loop members to an adjacent upper loop member; and electrically interconnecting each lower loop member to ends of each adjacent upper loop member to form the first and second magnetic field generating coils around the stationary pole member, the first and second magnetic field generating coils for inducing a magnetic field in the stationary pole member in response to tracking control signals.

23. The method of claim 22 wherein the step of forming the microactuator includes:

forming the plurality of upper loop members into generally U-shaped members; and forming the stationary pole member into a generally 3-shaped member.

24. The method of claim 23 wherein the step of forming the load beam includes integrating a flexure at the distal end of the load beam and for supporting a read/write head.

25. The method of claim 24 wherein the step of forming the load beam includes integrating a flexure at the distal end of the load beam and having first and second longitudinally extending roll axis arms, a first end of the first roll axis arm extending between two ends of the stationary pole member such that a gap is created between the two ends of the stationary pole member and the first end of the roll axis arm for creating electromagnetic forces in response to tracking control signals which act on the first roll axis arm to move the flexure along the tracking axis.

26. The method of claim 24 wherein the step of forming the load beam includes forming a load beam having at least two rails for movably supporting a distal section of the load beam including the flexure from the rigid region.

27. The method of claim 26 wherein:

the step of forming the load beam includes:

chemically etching a moving pole member from the second laminated sheet;

forming a flexure that includes a T-flexure having a tongue with a free end extending toward the rigid region of the load beam; and mounting the flexure onto the two rails; and the step of forming the microactuator includes:

mounting a first end of the moving pole member to the free end of the tongue and extending a second end of the moving pole member between two ends of the stationary pole member such that a gap is created between the two ends of the stationary pole member and the second end of the moving pole member for creating electromagnetic forces in response to tracking control signals which act on the moving pole member to move the flexure along the tracking axis.

* * * * *